US012296625B2

(12) United States Patent
McNaught

(10) Patent No.: US 12,296,625 B2
(45) Date of Patent: May 13, 2025

(54) SYSTEM FOR MANAGING TIRE PRESSURES OF A VEHICLE

(71) Applicant: Airdial Pty Ltd., Carseldine (AU)

(72) Inventor: Steven McNaught, Carseldine (AU)

(73) Assignee: Airdial Pty Ltd., Carseldine (AU)

( * ) Notice: Subject to any disclaimer, the term of this patent is extended or adjusted under 35 U.S.C. 154(b) by 216 days.

(21) Appl. No.: 17/748,097

(22) Filed: May 19, 2022

(65) Prior Publication Data
US 2022/0371385 A1 Nov. 24, 2022

(30) Foreign Application Priority Data
May 19, 2021 (AU) .................. 2021901505

(51) Int. Cl.
*B60C 23/04* (2006.01)
*B60C 29/06* (2006.01)
*B60C 23/10* (2006.01)

(52) U.S. Cl.
CPC ...... *B60C 23/0442* (2013.01); *B60C 23/0416* (2013.01); *B60C 23/0449* (2013.01); *B60C 23/0484* (2013.01); *B60C 29/064* (2013.01); *B60C 23/10* (2013.01)

(58) Field of Classification Search
CPC ............ B60C 23/0442; B60C 23/0416; B60C 23/0449; B60C 23/0484; B60C 29/064; B60C 23/10; B60C 23/00305; B60C 23/00372; B60C 23/00354; B60C 23/16
USPC ....................................................... 340/442
See application file for complete search history.

(56) References Cited

U.S. PATENT DOCUMENTS

| | | | | |
|---|---|---|---|---|
| 2,525,256 | A * | 10/1950 | Frederick | B60C 29/062 417/186 |
| 6,286,565 | B1 * | 9/2001 | Pike | B60C 23/00354 141/94 |
| 11,505,013 | B2 * | 11/2022 | Henry | B60C 23/00354 |
| 2013/0087224 | A1 * | 4/2013 | Galasso | F17C 9/00 137/557 |
| 2017/0080761 | A1 * | 3/2017 | King | B60C 23/00372 |
| 2018/0170125 | A1 * | 6/2018 | Woodley | B60C 23/00318 |
| 2018/0312017 | A1 * | 11/2018 | Woodley | B60C 23/00354 |
| 2019/0263362 | A1 * | 8/2019 | Hammer | B60C 29/064 |
| 2021/0061027 | A1 * | 3/2021 | Da Deppo | B60C 23/041 |
| 2021/0061028 | A1 * | 3/2021 | Da Deppo | B60C 23/00327 |

FOREIGN PATENT DOCUMENTS

WO WO-2013063689 A1 * 5/2013 ............. B60C 25/18

* cited by examiner

*Primary Examiner* — Eric Blount
(74) *Attorney, Agent, or Firm* — Amburn Law PLLC; Dean W. Amburn

(57) ABSTRACT

A tire management system is provided for automatically inflating and deflating tires of a vehicle. The system comprises: couplings, for releasably coupling to each of the tires of the vehicle; an inlet, for receiving compressed gas, the inlet selectively couplable to the couplings for inflating the tires of the vehicle; an outlet, selectively couplable to the couplings for deflating the tires of the vehicle; and a controller, configured to receive a desired target pressure for one or more of the tires and automatically couple the inlet or outlet to the one or more tires to achieve the target pressure. The tires are grouped into two or more groups of tires, and wherein the controller is configurable to inflate and/or deflate the tires according to the groups of tires.

19 Claims, 14 Drawing Sheets

SYSTEM FOR MANAGING TIRE PRESSURES OF A VEHICLE

RELATED APPLICATIONS

This application claims priority to and the benefit of Australian Patent Application No. 2021901505, filed on May 19, 2021, the entire contents of which are hereby incorporated by reference.

TECHNICAL FIELD

The present invention relates to management of tire pressures in vehicles. In particular, although not exclusively, the present invention relates to automatic management of tire pressures in four-wheel-drive (4WD) vehicles when transitioning between different driving surfaces or to compensate for different driving conditions.

BACKGROUND ART

4WD vehicles have increased in popularity in recent years, as they provide a comfortable on-road experience for daily use, combined with off-road capabilities for outdoor adventures, such as off-road and beach driving.

It is well known that the traction of vehicles on soft terrain, and particularly on sand, is greatly improved by decreasing tire pressure, as this increases the tire contact area (the "footprint" of the tire). Similarly, it is desirable to increase the tire pressure again when travelling on roads and highways. Different tire pressures may also be desirable depending on vehicle weight (loading), and whether the vehicle is towing or not. As such, different tire pressures are desirable in different conditions.

Mechanical tire deflation devices exist, that may be coupled to a tire, which include a valve that remains open (thereby deflating the tire) until the tire pressure drops below a set or predetermined value. Similarly, portable compressors exist, which may be used to inflate tires to a desired pressure.

A problem with such compressors and deflation devices is that they can be time consuming to use. In particular, each tire must generally be inflated or deflated manually, and for large tires, this process may be time consuming.

Furthermore, the use of such compressors and deflation devices may be difficult, particularly for those that are inexperienced. As a result, incorrect tire pressures may be used, which may be dangerous, cause traction issues, and/or premature tire wear.

As such, there is clearly a need for improved systems for managing tire pressures in vehicles.

It will be clearly understood that, if a prior art publication is referred to herein, this reference does not constitute an admission that the publication forms part of the common general knowledge in the art in Australia or in any other country.

SUMMARY OF INVENTION

The present invention relates to systems and methods for managing tire pressures of vehicles, which may at least partially overcome at least one of the abovementioned disadvantages or provide the consumer with a useful or commercial choice.

With the foregoing in view, the present invention in one form, resides broadly in a system for automatically inflating and deflating tires of a vehicle, the system including:

couplings, for releasably coupling to each of the tires of the vehicle;

an inlet, for receiving compressed gas, the inlet selectively couplable to the couplings for inflating the tires of the vehicle;

an outlet, selectively couplable to the couplings for deflating the tires of the vehicle; and a controller, configured to receive a desired target pressure for one or more of the tires and automatically couple the inlet or outlet to the one or more tires to achieve the target pressure, wherein the tires are grouped into one or more groups of tires, and wherein the controller is configurable to inflate and/or deflate the tires according to the groups of tires.

Advantageously, the system provides a simple, fast and accurate method of changing tire pressures to suit environmental changes or to compensate for different driving conditions. By grouping tires, the system enables different pressures to be provided in front and rear tires, by placing the front and rear tires into different groups, which is recommended by many vehicle manufacturers, particularly when the vehicle is loaded.

Preferably, the tires are grouped into two or more groups of tires.

Preferably, the groups of tires include a group comprising front tires of the vehicle and a group comprising rear tires of the vehicle. The groups of tires may include a trailer tire group.

Preferably, the system includes a pressure transducer, coupled to the controller, wherein the controller is configured to automatically couple the inlet or outlet at least in part according to a pressure from the pressure transducer.

Preferably, the groups of tires are selectively couplable to the pressure transducer, to enable measurement of the groups of tires individually.

Preferably, the controller includes a memory, including a plurality of pre-set tire pressure settings, wherein the controller receives a desired target pressure by receiving a pre-set tire pressure setting.

Preferably, at least part of the system is permanently mounted to the vehicle.

Preferably, the system includes one or more vehicle mounting panels, to which the couplings may be releasably attached. The vehicle mounting panels may include a Schrader valve for each tire.

The system may include vehicle mounting panels on each side of the vehicle.

Alternatively, the system may be installed in a workshop or garage.

The couplings may comprise flexible hoses. The flexible hoses may include quick connect air chucks on ends thereof.

The quick connect air chucks may include a check valve that is opened when connected to the tire or vehicle mounting panel, and closed otherwise. Such configuration enables the user to connect the hose to the tire or vehicle mounting panel first without losing any pressure from the tire or system.

Preferably, the system includes a user interface, for enabling a user to select a desired target pressure. The user interface may enable the user to directly or indirectly select the desired target pressure.

The user interface may enable indirect selection of the desired target pressure by selection of a pre-set tire pressure setting of a plurality of pre-set tire pressure settings. The settings may correspond to different driving conditions (e.g. sand).

The user interface may include a dial, for selecting a desired target pressure. The dial may enable the user to select one of the pre-set tire pressure settings.

The system may include a display, for displaying information to the user. The display may display selected pressure settings. The display may be used together with the dial for selecting a desired target pressure.

Preferably, the system includes a plurality of solenoids, configurable to selectively couple each group of tires to the inlet or outlet.

Preferably, the system includes a manifold, including a pressure transducer, wherein the system includes solenoids for selectively coupling each of the tire groups, the inlet, and the outlet to the manifold.

Preferably, the gas comprises air.

Preferably, the system includes a high-pressure compressed air source coupled to the inlet. The high-pressure compressed air source may include a cylinder and an air compressor.

Preferably, the outlet includes a venturi exhaust. The venturi exhaust may be coupled to the high-pressure compressed air source such that flow of air from the high-pressure air source creates suction to assist in deflating the one or more tires.

Preferably, the system includes a positioning or tracking system, such as a global positioning system (GPS) device or system. Target pressures may be proposed is provided according to a geographic location identified by the positioning or tracking system. The positioning or tracking system may form part of the system, or may be coupled to the system, e.g. in the form of a smartphone coupled to the system.

The system may include a data interface, such as a cellular or wireless data interface.

The system may be configured to retrieve suggested tire pressures for an area, surface, type of vehicle, and/or type of tire from a remote device using the data interface. Similarly, the data interface may be used to share tire pressures, e.g. one user may obtain details of tire pressures used by others in a particular area, for a particular surface (e.g. sand), type of vehicle, and/or type of tire.

In another form, the invention resides broadly in a closed-type air chuck for use with a vehicle tire, the air chuck including:
- a body having an inlet, for receiving compressed air;
- a valve receiving portion, for dispensing compressed air into a valve of a tire; and
- a floating valve in the valve receiving portion, the floating valve biased to a closed configuration where air is prevented from flowing through the air chuck,
- wherein the floating valve is configured to engage with the valve of the tire to move the floating valve to an open configuration where air is allowed to flow through the air chuck.

Preferably, the floating valve is received in an end of a hollow central tube. Preferably, the floating valve is configured to translate relative to the body and the valve receiving portion.

Preferably, the valve receiving portion includes a pair of retainers, for retaining the valve of the tire. The retainers may include retaining bars on respective sides of the valve receiving portions.

Preferably, the valve receiving portion is configured to translate relative to the body. Preferably, the retainers are disengaged by translation of the valve receiving portion relative to the body.

Any of the features described herein can be combined in any combination with any one or more of the other features described herein within the scope of the invention. In particular, the closed-type air chuck may be used with the system.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 9a illustrates a side perspective view of an air chuck, according to an embodiment of the present invention.

FIG. 9b illustrates an upper side perspective view of the air chuck of FIG. 9a.

FIG. 9c illustrates a front view of the air chuck of FIG. 9a.

FIG. 9d illustrates a side view of the air chuck of FIG. 9a.

FIG. 9e illustrates an exploded perspective view of the air chuck of FIG. 9a.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
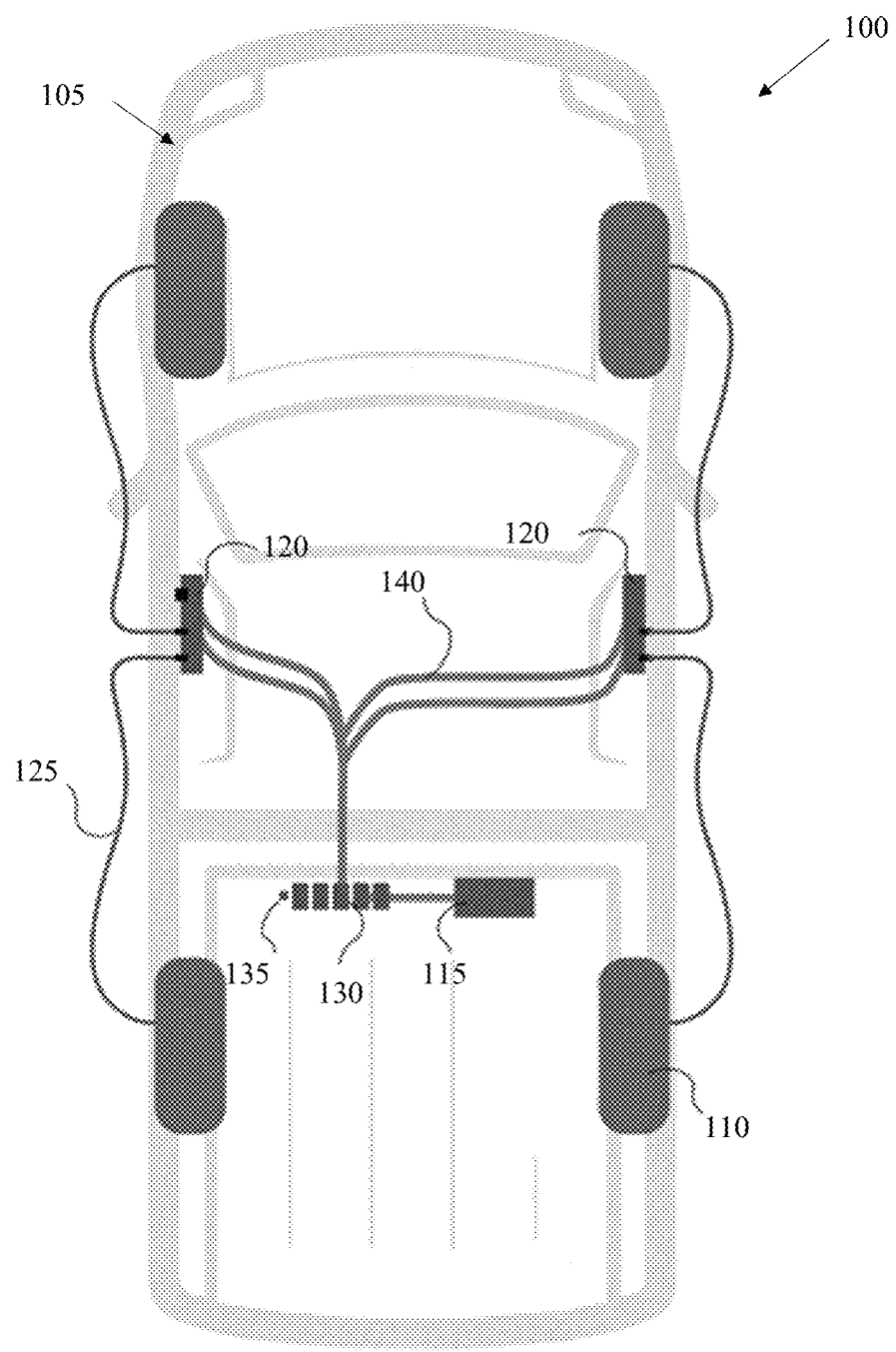
FIG. 1 illustrates a simplified diagram of a system for automatically inflating and deflating tires of a vehicle, according to an embodiment of the present invention.

FIG. 1 illustrates a simplified diagram of system 100 for automatically inflating and deflating tires of a vehicle 105, according to an embodiment of the present invention. Advantageously, the system 100 enables the pressure of tires 110 of the vehicle 105 to be easily and accurately changed (inflated or deflated to a desired pressure) according to changing needs of the vehicle 105. This is particularly beneficial when the vehicle 105 is transitioning between different surfaces, e.g. from asphalt to sand or vice versa, or when circumstances change (e.g. towing).

The system 100 includes a high-pressure compressed air source 115, such as a compressor with associated air cylinder, for providing high-pressure compressed air to the tires 110. The high-pressure compressed air source 115 is couplable to the tires 110 by vehicle mounting panels 120 on each side of the vehicle 105, and releasably couplable quick connect flexible hoses 125 (often called "whips") between the vehicle mounting panels 120 and each of the tires 110.

Solenoids 130 and a pressure sensor (transducer) 135 along with permanent air tubing 140 is provided between the high-pressure compressed air source 115 and the vehicle mounting panels 120 to enable automatic control of the pressure to each of the tires 110.

In a typical installation, the high-pressure compressed air source 115, the vehicle mounting panels 120, the solenoids 130, the pressure sensor (transducer) 135 and the permanent air tubing 140 is permanently installed in the vehicle 105, such that it is ready to use when desired. Such installation may be provided on an inside of the vehicle 105 (e.g. under seats of the vehicle), in a tray of the vehicle 105 (e.g. for utility vehicles), and/or under a body or tray of the vehicle 105. As such, only the releasably couplable quick connect flexible hoses 125 need be attached to enable the system 100 to automatically adjust the pressure of the tires 110.

Figure 2:
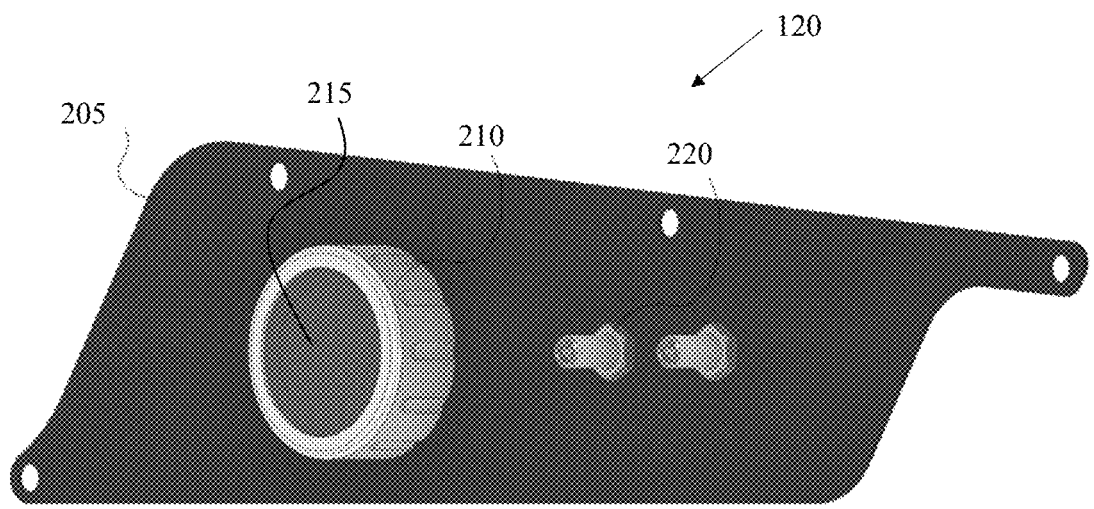
FIG. 2 illustrates a perspective view of a vehicle mounting panel of the system of FIG. 1, according to an embodiment of the present invention.

FIG. 2 illustrates a perspective view of a vehicle mounting panel 120, according to an embodiment of the present invention.

The vehicle mounting panel 120 includes a mounting panel portion 205, an adjustment dial 210, a display 215, and first and second Schrader valves 220.

The vehicle mounting panel 120 is configured to be installed inside a vehicle and the mounting panel portion 205 includes a plurality of attachment apertures 225, configured to enable attachment to the vehicle using fasteners. The vehicle mounting panel 120 is typically vehicle model specific, therefore enabling the vehicle mounting panel 120 to be easily installed in that model of vehicle.

The panel 120 of FIG. 2 is adapted to be installed under a seat of the vehicle, but in other embodiments, other mounting locations may be provided. The mounting panel portion 205 is preferably vehicle model specific, such that it is easy to install in the most common vehicles. Generic mounting panels may, however, also be provided for custom installations. The use of different mounting panel portions 205 enables a cost-effective means for providing vehicle model specific installations as the remaining components may be common across different models.

The dial 210 provides a user interface for a user of the system, and enables the user to select one of a pre-set tire pressure configuration (e.g. road, off-road, sand, snow), or manually adjust the target tire pressure. The exterior of the dial 210 can be rotated both clockwise and counter-clockwise, and may be depressed, actuating a push-button.

The display 215 is a small LCD display which enables the user to see the set configuration, navigate between menu options, and the like. The display 215 is located on a central portion of the dial 210, but does not rotate with the dial 210 (only an outer portion thereof rotates).

Finally, the first and second Schrader valves 220 are the same type of valves used on the tires 110, enabling the releasably couplable quick connect flexible hoses 125 to be connected either way, simplifying installation.

Figure 3:
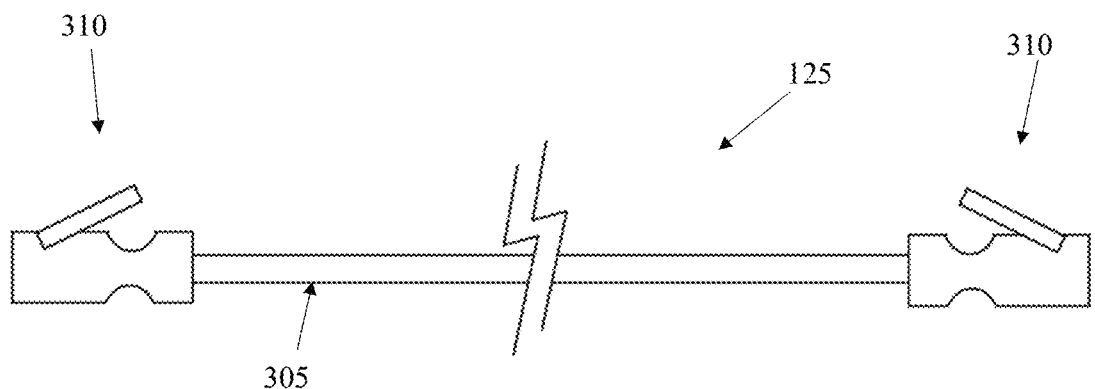
FIG. 3 illustrates a side view of a releasably couplable quick connect flexible hose of the system of FIG. 1, according to an embodiment of the present invention.

FIG. 3 illustrates a side view of a releasably couplable quick connect flexible hose 125, according to an embodiment of the present invention.

The releasably couplable quick connect flexible hose 125 comprises a flexible hose portion 305, with quick connect air chucks 310 on ends thereof. The quick connect air chucks 310 are both closed-type, and thus include a check valve that is opened by the Schrader valve of the tire 110 or vehicle mounting panel 120. Such configuration simplifies installation as it enables the user to connect the hose 125 to the tire 110 or vehicle mounting panel 120 first without losing any air pressure from the tire 110 or system 100.

The quick connect air chucks 310 include spring loaded locking member, for locking the chucks 310 to the Schrader valves, to thereby prevent the air chucks 310 from inadvertently coming loose.

Figure 4:
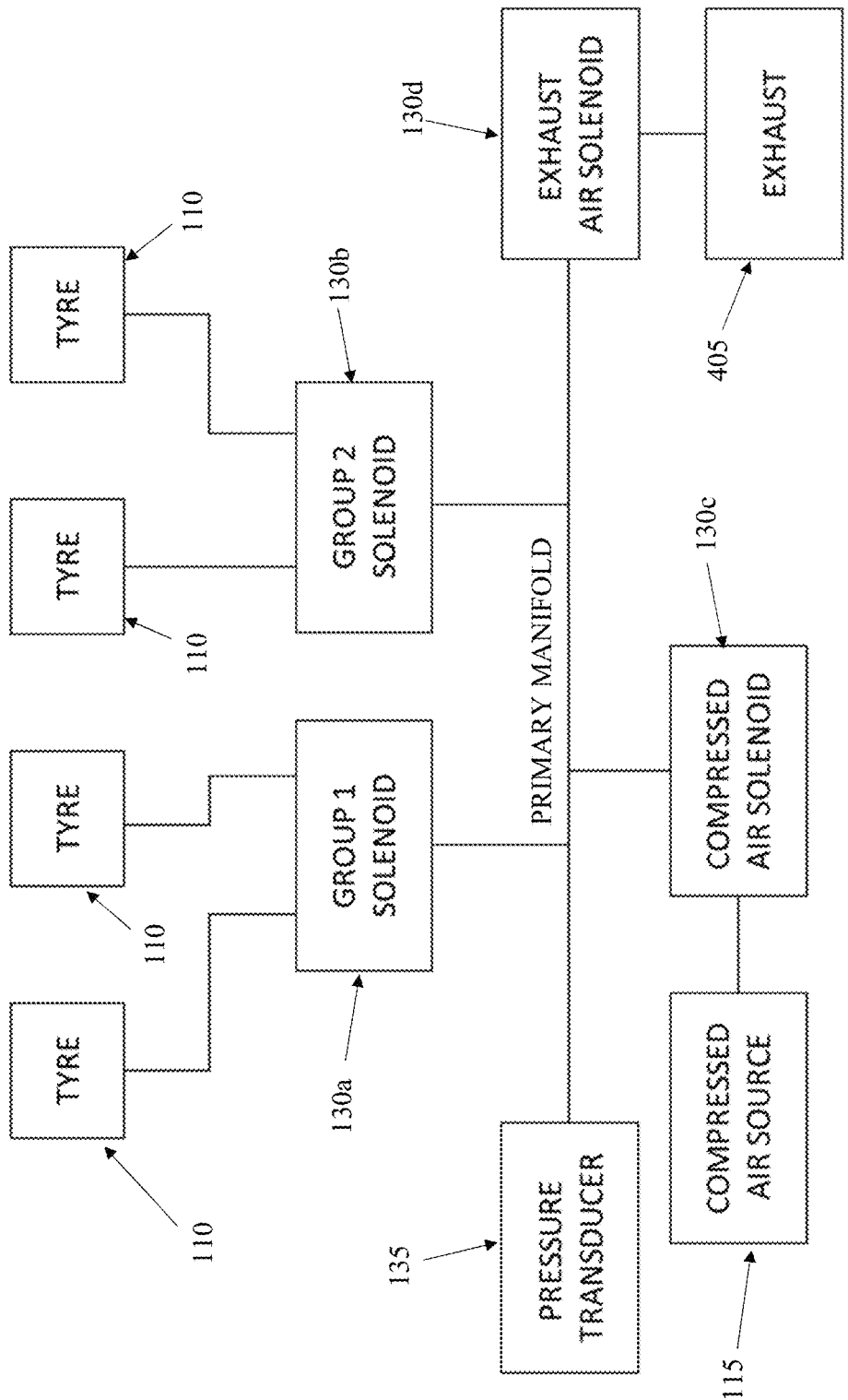
FIG. 4 illustrates a schematic of a pneumatic portion of the system of FIG. 1, according to an embodiment of the present invention.

FIG. 4 illustrates a schematic of a pneumatic portion of the system 100, according to an embodiment of the present invention.

The tires 110 are grouped into first and second groups (e.g. a front tire group and a rear tire group), and each group includes a respective solenoid 130a, 130b. The solenoids 130a, 130b enable the groups of tires 110 to be pneumatically coupled and decoupled from a primary manifold of the system 100, thereby enabling the first and second groups to be independently inflated and deflated to different pressures.

The compressed air source 115 is also coupled to the primary manifold by a compressed air solenoid 130c, enabling the compressed air source 115 to be pneumatically coupled and decoupled to the primary manifold of the system 100. Similarly, an exhaust (outlet) 405 is coupled to the primary manifold by an exhaust solenoid 130d, enabling selective release of air from the system 100 (to atmosphere or a reservoir).

The pressure transducer 135 is also coupled to the primary manifold of the system 100, enabling pressure of the tire groups to be read through selective activation of the solenoids 130a-d.

In particular, the solenoids 130a-d enable different parts of the system to be coupled to perform different functions. For example, the compressed air solenoid 130c and the group 1 solenoid 130a are opened (and remaining solenoids 130 closed) to enable the compressed air source to inflate the tires 110 in group 1.

Figure 5:
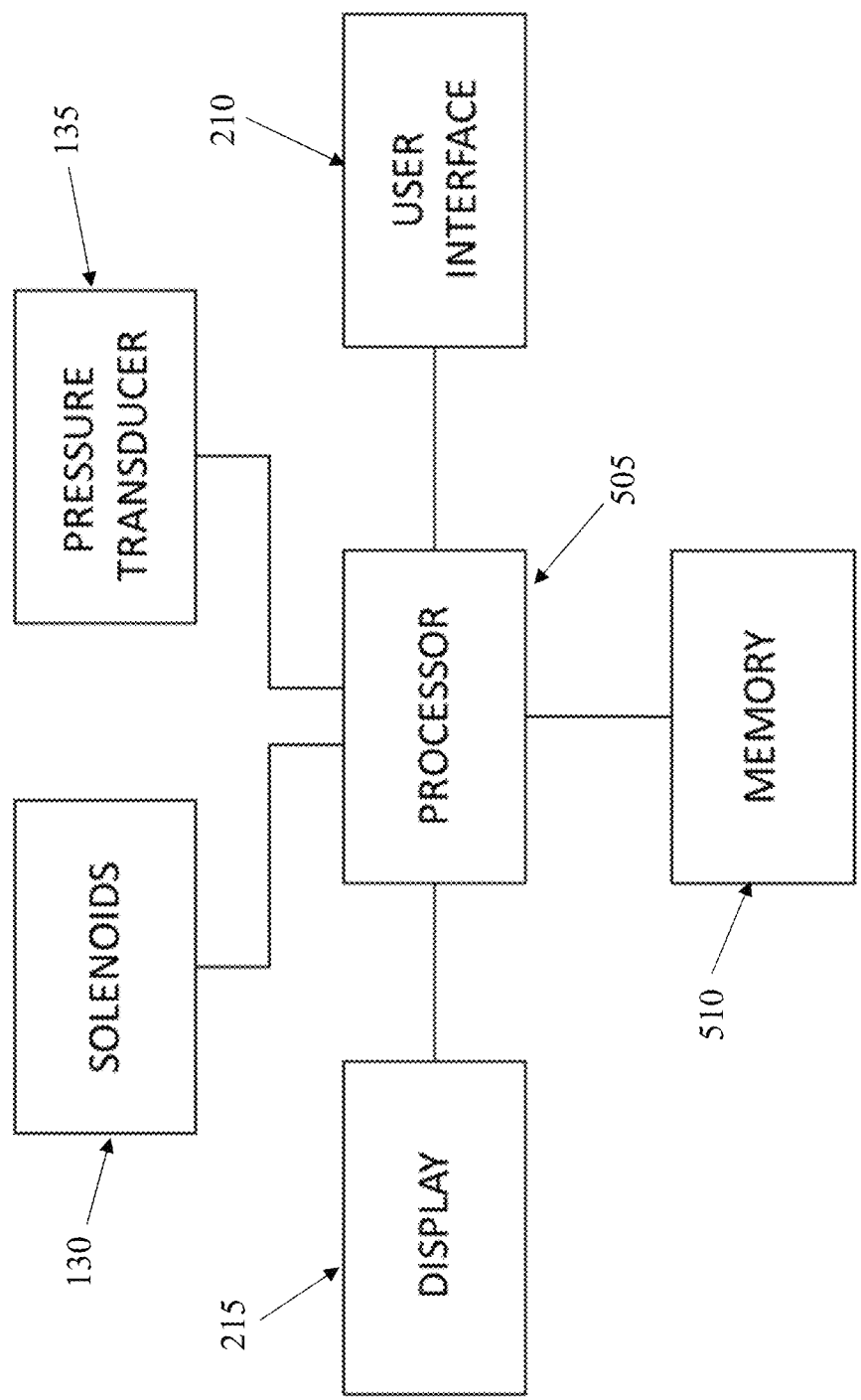
FIG. 5 illustrates a schematic of a control portion of the system of FIG. 1, according to an embodiment of the present invention.

FIG. 5 illustrates a schematic of a control portion of the system 100, according to an embodiment of the present invention.

The system 100 includes a processor 505 coupled to the solenoids 130, pressure transducer 135, user interface (adjustment dial) 210 and display 215, and is configured to control operation of the solenoids 130 according to input from the pressure transducer 135 and user interface 210, and display output on the display 215.

A memory 510 is coupled to the processor 505 and includes instruction code executable by the processor 505 for performing various control functions, and data, for input to the control functions.

In use, the user starts by connecting the quick connect hoses 125 to each tire 110. The display 215 may prompt the user to connect the hoses 125 to the tires 110, and the system 100 may be configured to determine whether the hoses 125 are connected to the tires (e.g. by reading tire pressures), and issue a warning in case the tires 110 are not connected.

The user may then select a pre-set desired tire pressure (e.g. a "sand" profile), or manually select desired tire pressure(s). In particular, different tire pressures may be used for each group of tires 110, enabling different pressures to be used in front and rear tires, for example. In case a profile is selected, associated pre-defined tire pressure(s) are retrieved from a memory.

The solenoids 130a, 130b are opened (one at a time) with the remaining solenoids 130 closed to enable the pressure transducer 135 to take pressure measurements of the tires 110. The pressure measurements are then compared to target pressures, and the tires are inflated if the target pressure is above (or deflated if the target pressure is below) the actual pressure by opening the compressed air solenoid 130c (or exhaust solenoid 130d). This process is repeated until the tires 110 reach their desired pressure.

The system 100 may be configured to open the compressed air solenoid 130c or exhaust solenoid 130d for different periods of time according to a difference between the actual air pressure and the target pressure. This enables the system to operate quickly initially, and fine tune pressures when close to the target. Similarly, the system 100 may estimate a volume of air required (or needing to be released) and open the valves 130c, 130d according to such estimate.

Once the target pressure has been reached, the user is alerted via one or more appropriate signals, such as an audible tone, a message on the display 215, a message sent to or displayed on a smartphone or other portable computing device, or any other suitable mechanism.

In some embodiments, the processor is coupled to global positioning system (GPS) device or system, or other positioning or tracking system, and target pressures are proposed is provided according to a geographic location. The GPS device or system may form part of the system, or may be coupled to the system, e.g. in the form of a smartphone coupled to the system.

As an illustrative example, the system may determine that the geographic location is a sand location (e.g. a beach) and automatically recommend, or set as default, a tire pressure that is suitable for use on sand.

Similarly, the processor may be coupled to a data interface, such as a cellular or wireless data interface. The system may be configured to retrieve suggested tire pressures for an area, surface, type of vehicle, and/or type of tire from a remote device using the data interface. Similarly, the data interface may be used to share tire pressures, e.g. one user may obtain details of tire pressures used by others in a particular area, for a particular surface (e.g. sand), type of vehicle, and/or type of tire. This essentially enables crowd-sourcing of tire pressure values.

Similarly, the data interface may be used to remotely update or reconfigure software or firmware of the system. In such case, over the air firmware updates may be done via a smartphone app or automatically, e.g. via the user's home Wi-Fi/internet when the car is garaged.

In many off-road vehicles, large tires are used. A problem with large tires is that deflation can be slow.

In many prior art systems, the tire is inflated for a set amount of time (e.g. 5s), inflation is stopped and the tire pressure is checked. The tire is further inflated for a set amount of time, inflation is again stopped and the tire pressure is again checked. This is repeated until the desired tire pressure is reached, which can be quite slow.

In some embodiments, the processor estimates an inflation time of the tire using a measured tire pressure, a pressure differential between the tire pressure and atmospheric pressure, historical inflation data, tire volume data, and/or any other suitable data. This enables longer inflation periods between measurements, which in turn reduces inflation times.

Furthermore, data regarding previous inflation or deflation operations on the vehicle (or even a similar vehicle or tire elsewhere), may be used to provide faster and more accurate inflation or deflation operations, essentially providing a learning loop.

In some embodiments, a venturi exhaust is used to increase deflation speed.

Figure 6:
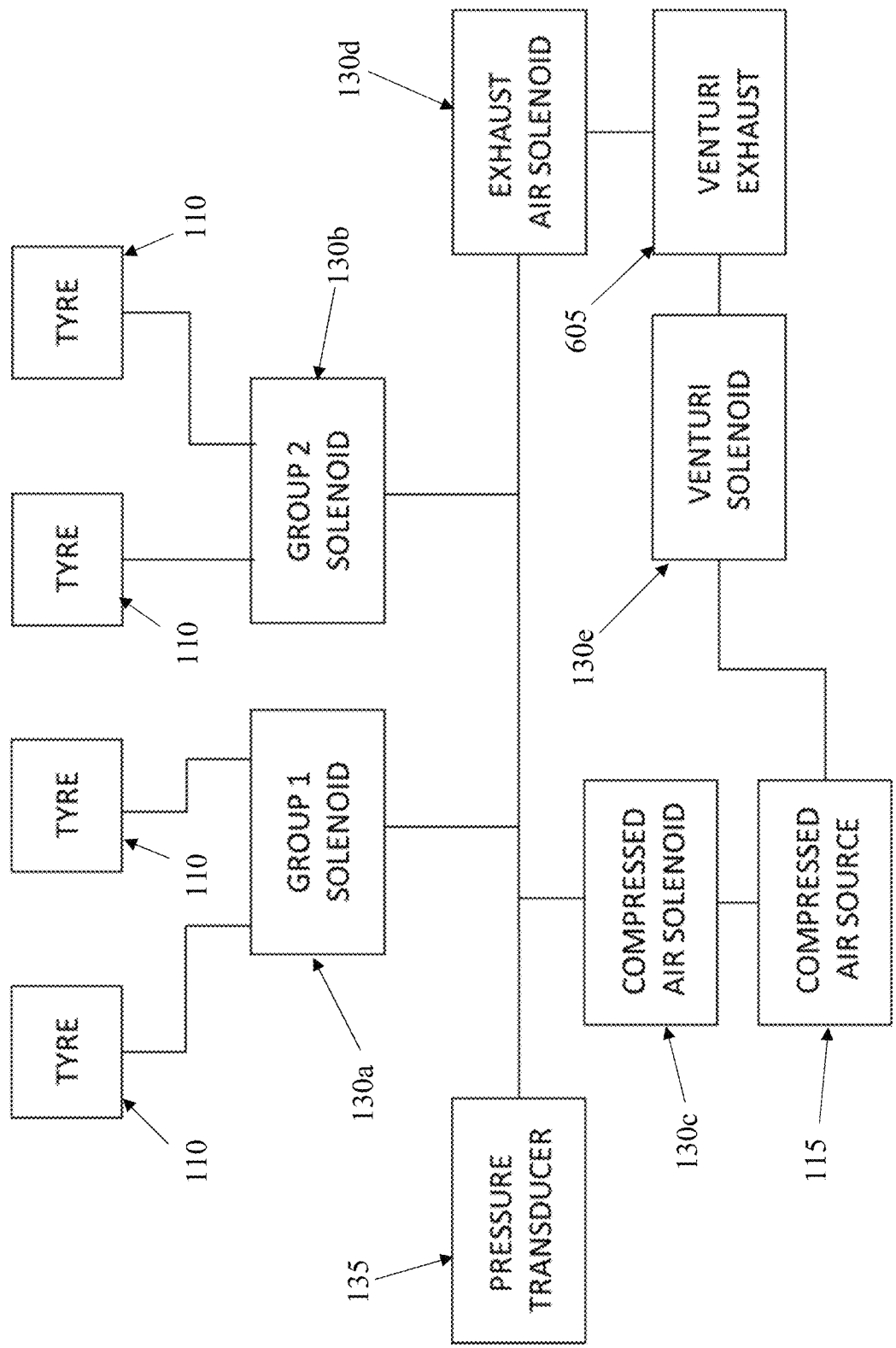
FIG. 6 illustrates a schematic of a pneumatic portion of a system, similar to the system of FIG. 1, but with a venturi exhaust, according to an embodiment of the present invention.

FIG. 6 illustrates a schematic of a pneumatic portion of a system, similar to the system 100, but with a venturi exhaust 605, according to an embodiment of the present invention. The venturi exhaust 605 increases the pressure differential between the tire and the exhaust, thereby creating a vacuum (low pressure) inside the air lines.

The compressed air source 115 is coupled to the venturi exhaust 605 by a venturi solenoid 130e, to enable selective operation thereof.

In use, when deflation is desired, the exhaust solenoid 130d is opened (as is the case for the system 100), but the venturi solenoid 130e is also opened, enabling the compressed air to flow through the venturi exhaust 605. The compressed air creates a venturi that essentially "pulls" the air out of the tires.

In other embodiments, it is desirable to separate inflation and deflation processes for each tire group. Such configuration may increase inflation and deflation speeds.

Figure 7:
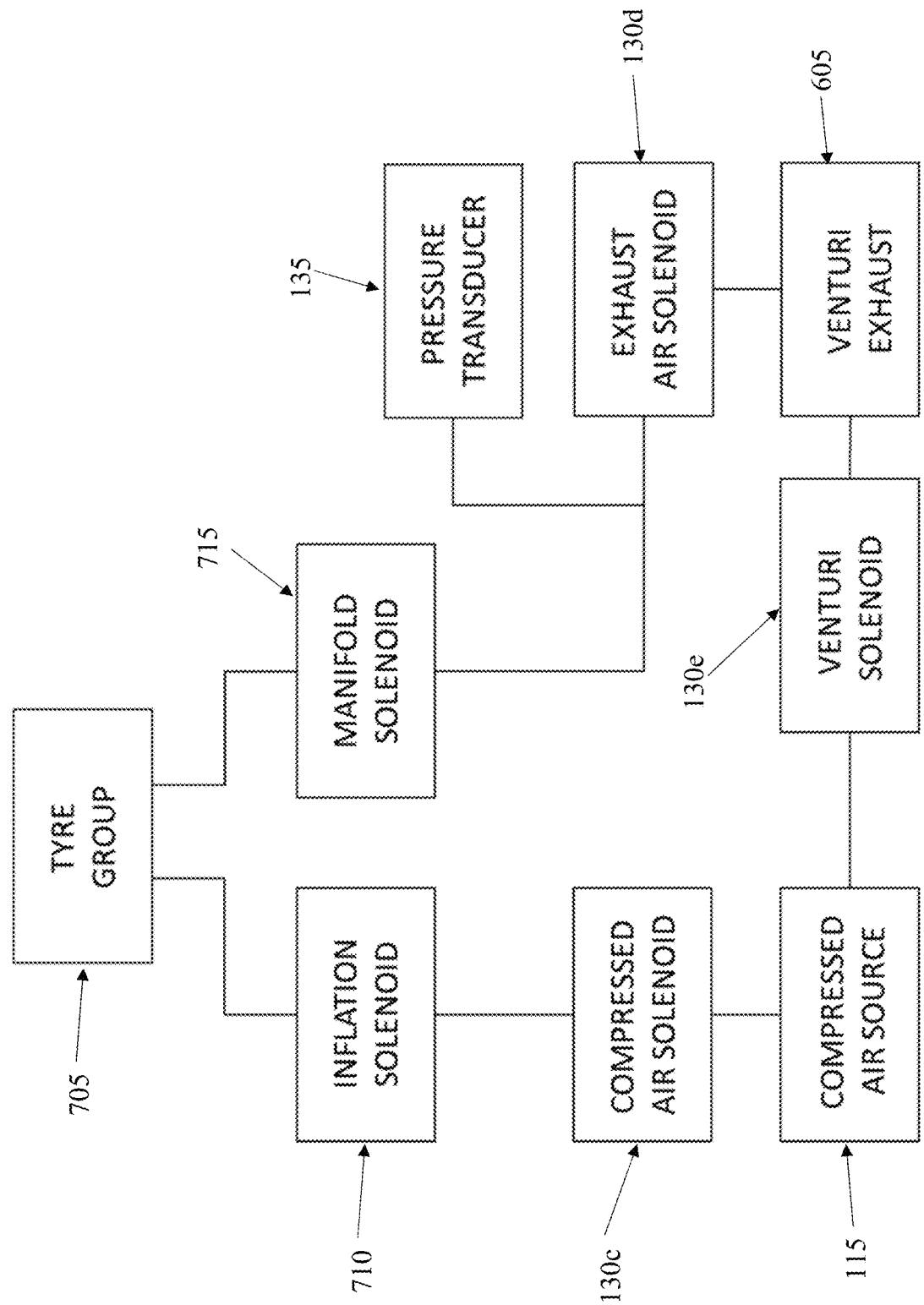
FIG. 7 illustrates a schematic of a pneumatic portion of a system, similar to the system of FIG. 6, but with separate inflation and deflation channels for each tire group, according to an embodiment of the present invention.

FIG. 7 illustrates a schematic of a pneumatic portion of a system, similar to the system 600, but with separate inflation and deflation channels for each tire group 705, according to an embodiment of the present invention.

Only one tire group 705 is illustrated for the sake of simplicity, but the skilled addressee will readily appreciate that multiple tire groups will be used, including at least one tire group for front tires and at least one tire group for rear tires.

Each tire group 705 is associated with an inflation solenoid 710, for selectively coupling the tire group 705 to the compressed air source, and a manifold solenoid 715, for selectively coupling the tire group 705 to a manifold of the system including the pressure transducer 135, and the exhaust solenoid 130d.

By using separate solenoids for inflation and deflation (solenoids 710 and 715 respectively), increased flow (inflation or deflation) may be achieved, particularly if the solenoids 710, 715 are designed for flow in a particular direction.

The system described in FIG. 7 is modular, and enables any number of tire groups to be added. Such configuration is particularly suited for 6-wheel vehicles (or more), and for vehicles with trailers, where the trailer tires are also adjusted using the system.

In addition to trailer tires, the skilled addressee will readily appreciate that other types of compressed air accessories may be coupled to the system, in the vehicle or otherwise.

Figure 8:
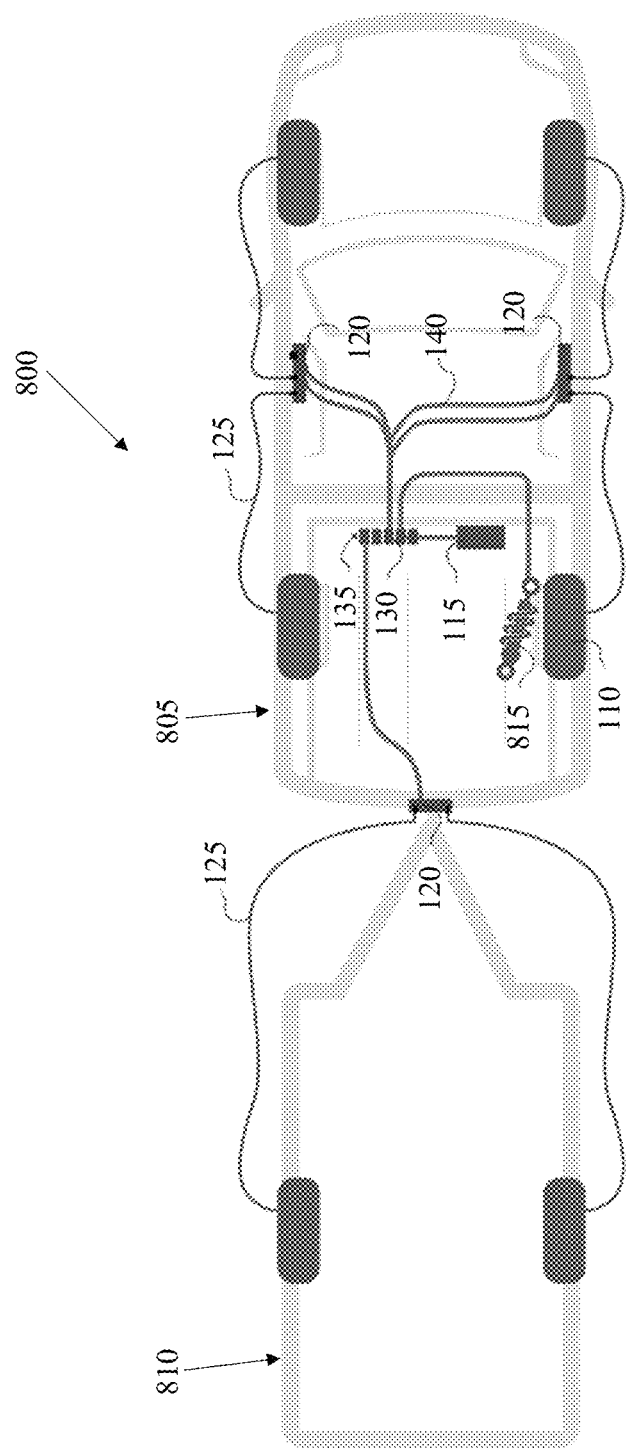
FIG. 8 illustrates a simplified diagram of a system for automatically inflating and deflating tires of a vehicle, installed in a vehicle with a trailer, according to an embodiment of the present invention.

FIG. 8 illustrates a simplified diagram of a system 800 for automatically inflating and deflating tires of a vehicle 805, installed in a vehicle 805 with a trailer 810, according to an embodiment of the present invention.

The vehicle 805 includes air suspension system 815, which is coupled to the compressed air source 115 by one or more solenoids 130, enabling the air suspension system 815 to be "inflated" and "deflated" much like the tires 110. In some embodiments, pre-defined profiles may be selected which include tire pressure and suspension pressure information, wherein both tire pressure and suspension pressure are automatically changed according to the profile.

The vehicle 805 includes a mounting plate 120 at a rear thereof, enabling connection of flexible hoses 125 to tires of the trailer 810. As such, the tires of the trailer may be inflated and deflated in a similar manner to the tires of the vehicle 805.

While all tires are illustrated as being connected simultaneously in the above drawings, the skilled addressee will readily appreciate that the system will function with only one of (or a subset of) the tires connected. As the mounting plate 120 includes Schrader valves, which include a check-valve, these ensure that air is not released therethrough when not connected to a tire. Such configuration is useful if only the rear tire pressures need to be increased, for example, such as when the vehicle is loaded.

Similarly, the Schrader valves may be used to fill air into other items, such as bicycle tires, balls, or other inflatable items. In such case, a manual override mode may be used.

While the above examples mention air and an air compressor, the skilled addressee will readily appreciate that any other suitable gas sources may be used, such as nitrogen or carbon dioxide.

While the display and dial has been illustrated, the skilled addressee will readily appreciate that any suitable user interface may be used, including a wireless user interface, a smartphone application, or the like.

In some embodiments, pressure pre-sets can be edited/maintained in the user interface. As an illustrative example, users may create pre-sets (including pre-defined pressures for the tire groups), associate the pre-sets with text names and icons/images.

When configuring the system, the user may be prompted to enter details of the vehicle and/or tires, including vehicle year/make/model, and tire size. This may be used to improve inflation/deflation operation times, as outlined above, and also to enable other users to view data according to vehicle and tire parameters.

Similarly, the system may be configured to store a log of operations, allowing users to see previous operations performed, such as pressure adjustment, together with time and other data (e.g. location). The system may also log technical parameters, such as sensor data, fill times, and the like for diagnosis or other purposes.

The system may further be configured to compare tire pressures with those provided from the log, and issue an alert in case the pressure deviates from that provided in the log, which may be indicative of a leak or error.

Furthermore, the system may be configured to issue an alert in case a tire pressure from the log deviates from a recommended tire pressure for an area. As an illustrative example, if a user enters a sandy area (e.g. a beach) and the tire pressures are still high, the system may issue an alert or warning prompting the user to decrease their tire pressure. Similarly, if re-entering a bitumen surface after sand driving without adjusting tire pressures, the system may issue an alert or warning prompting the user to increase their tire pressure.

While any suitable air chucks may be used with the systems outlined above, it is desirable to use a high flow, closed-type air chucks, to speed up inflation and deflation of tires.

Figures 9A, 9B, 9E:
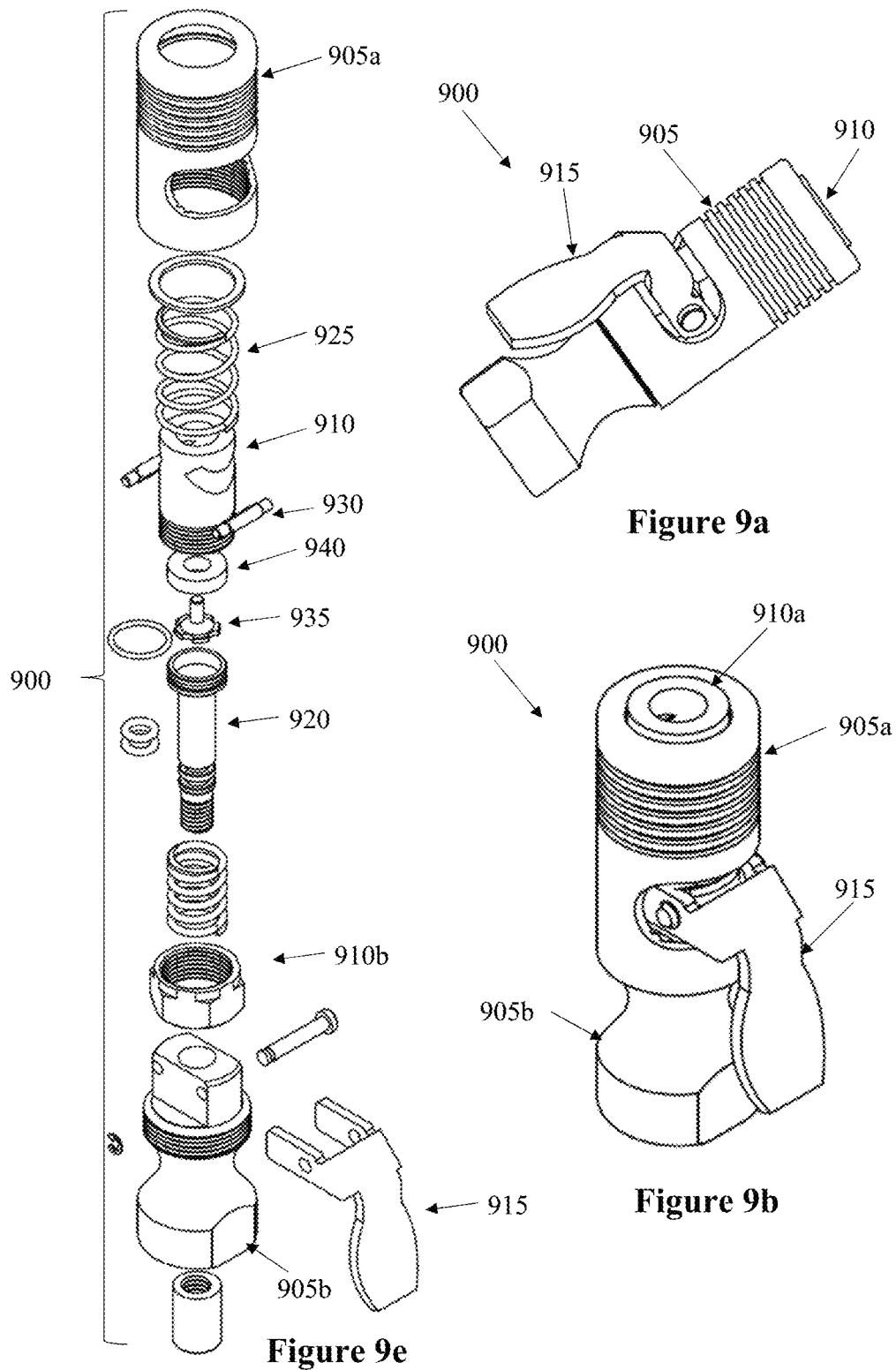

FIG. 9a illustrates a side perspective view of an air chuck 900, according to an embodiment of the present invention. FIG. 9b illustrates an upper side perspective view, FIG. 9c illustrates a front view, and FIG. 9d illustrates a side view of the air chuck 900.

The air chuck 900 is a high flow, closed-type air chuck which is particularly suited for use with the systems outline above, but may also be used in other contexts.

The air chuck 900 includes a body 905 comprising upper and lower body members 905a, 905b, and a valve receiving member 910, mounted in the body 905. The valve receiving member 910 is for receiving and engaging with a valve of a tire, namely a Schrader valve of a vehicle tire.

The air chuck includes a lever 915, extending through the body 905 and configured to engage with the valve receiving member 910, to disengage a locking assembly thereof, as outlined below.

Figure 9F:
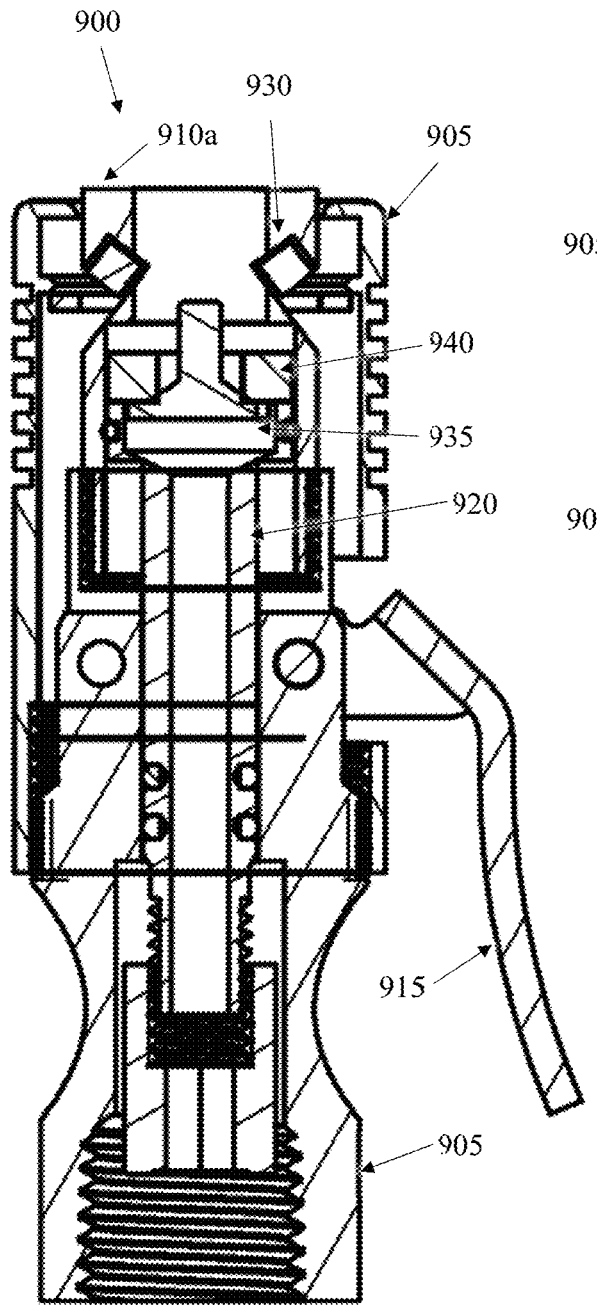
FIG. 9f illustrates a cross sectional view of the air chuck of FIG. 9a through A-A of FIG. 9c.
Figure 9C:
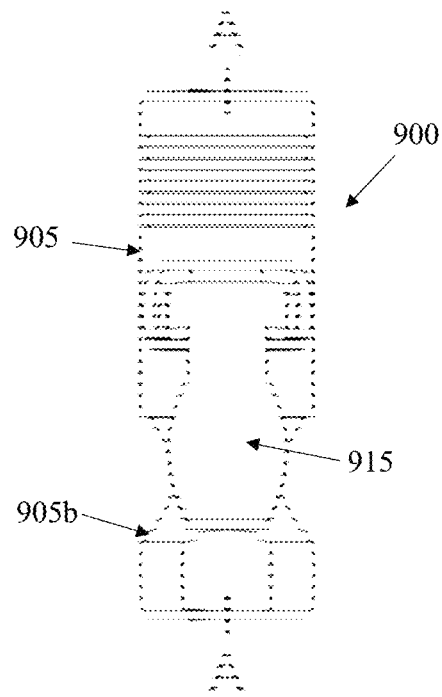
Figure 9D:
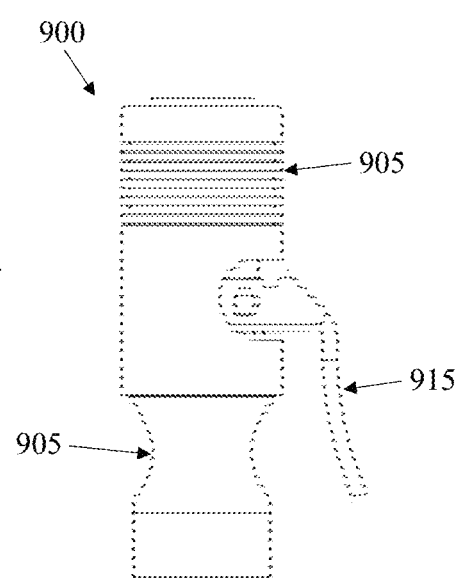

FIG. 9e illustrates an exploded perspective view of the air chuck 900, and FIG. 9f illustrates a cross sectional view of the air chuck 900 through A-A of FIG. 9c.

As best illustrated in FIG. 9e the valve receiving member 910 comprises upper and lower members 910a, 910b which engage with each other by respective threads. A centre tube 920 extends between the lower body member 905b and the upper member 910a, and sealingly engages with the lower body member 905b and the upper member 910a at/near its respective ends and using O-rings.

A spring 925 biases the valve receiving member 910 downwards from the upper body member 905a, and the lever 915 pushes the valve receiving member upwards relative to the body 905.

First and second retaining bars 930 engage with angled slots of the upper valve receiving member 910a, and extend therethrough to an inside of the upper valve receiving member 910a to engage with and retain a valve in the valve receiving member 910.

The angled slots cause the first and second retaining bars 930 to translate outwardly from a centre of the valve receiving member 910 when the valve receiving member 910 translates relative to the body 905 (i.e. when the lever is depressed). As such, the depression of the lever 915 disengages the air chuck 900 from the valve of the tire.

The use of first and second retaining bars 930 provides a stronger connection between the chuck 900 and the valve of the tire than a single sided retainer.

The centre tube 920 is hollow and has a 3.4 mm internal diameter, which enables the chuck 900 to have significant airflow therethrough compared to existing chucks. A floating centre-pin valve 935 is provided in an upper end of the centre tube 920. The valve 935 seals against an annular seal 940, to prevent the release of air through the chuck 900 when not engaged with a valve of a tire. When the chuck 900 engages with a valve of a tire, the valve of the tire pushes the floating centre-pin valve 935 and centre tube 920 downwards, disengaging the floating centre-pin valve 935 from the seal 940, and enabling air to flow through the chuck 900.

The lower body member 905b includes a threaded coupling for coupling to a hose engaging member, as is known in the art.

The chuck 900 includes a significantly larger core than existing tire chucks of similar size, and therefore provides a higher volume of air. This is at least partly achieved through the use of the floating valve 935, which enables the centre tube 920 to be large in diameter and entirely free from obstruction.

The use of the lever 915 together with the retaining bars 935 enables strong attachment to the valve, while proving a chuck 900 that is easy to disengage, particularly when there is tight clearance around the valve, which is common in four-wheel drive rims.

The systems described above can be configured in any number of ways, with solenoids provided in various configuration. For example, solenoids may be connected to manifolds and provided in modular configurations. FIGS. 10a-10e illustrate schematics of pneumatic portions of various systems, similar to those describe above, according to embodiments of the present invention.

Figure 10A:
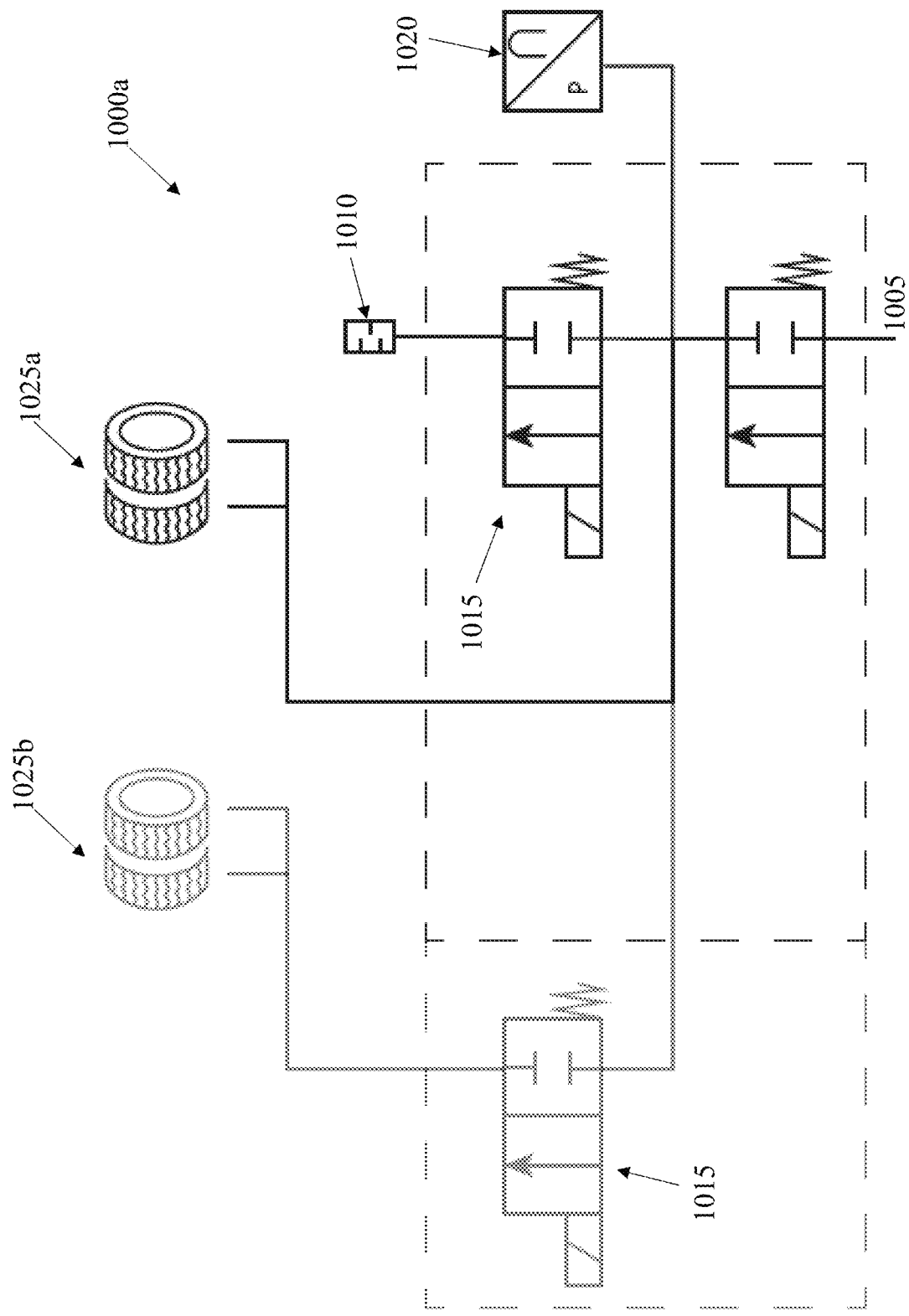
FIG. 10a illustrates an exemplary schematic of a pneumatic portion of a system for automatically inflating and deflating tires of a vehicle, according to an embodiment of the present invention.

FIG. 10a illustrates an exemplary schematic of a pneumatic portion of a system 1000a for automatically inflating and deflating tires of a vehicle, according to an embodiment of the present invention.

The system 1000a includes an input 1005, for receiving compressed air, an exhaust 1010 for discharging air, a plurality of solenoids 1015, and a pressure transducer 1020. The solenoids are configurable to adjust a pressure in first and second tire groups 1025a, 1025b.

Figure 10B:
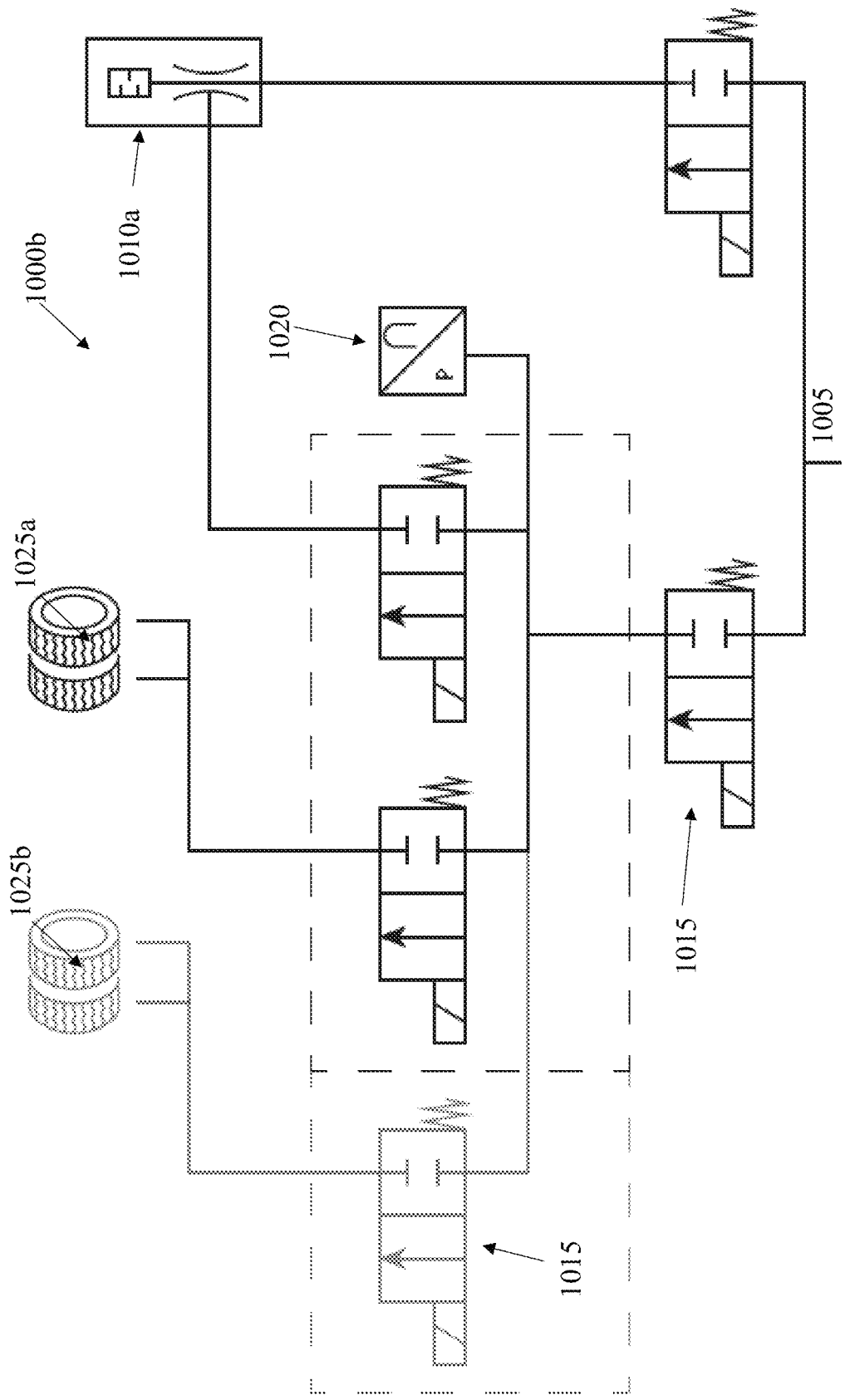
FIG. 10b illustrates an exemplary schematic of a pneumatic portion of a system for automatically inflating and deflating tires of a vehicle, according to an embodiment of the present invention.

FIG. 10b illustrates an exemplary schematic of a pneumatic portion of a system 1000b for automatically inflating and deflating tires of a vehicle, according to an embodiment of the present invention.

The system 1000b is similar to the system 1000a, but includes venturi exhaust 1010a. Furthermore, solenoids 1015 separately couple the first and second tire groups 1025a, 1025b to the pressure transducer 1020, to enable separate pressure measurements to be made, and separate pressures to be used in the first and second tire groups 1025a, 1025b.

Figure 10C:
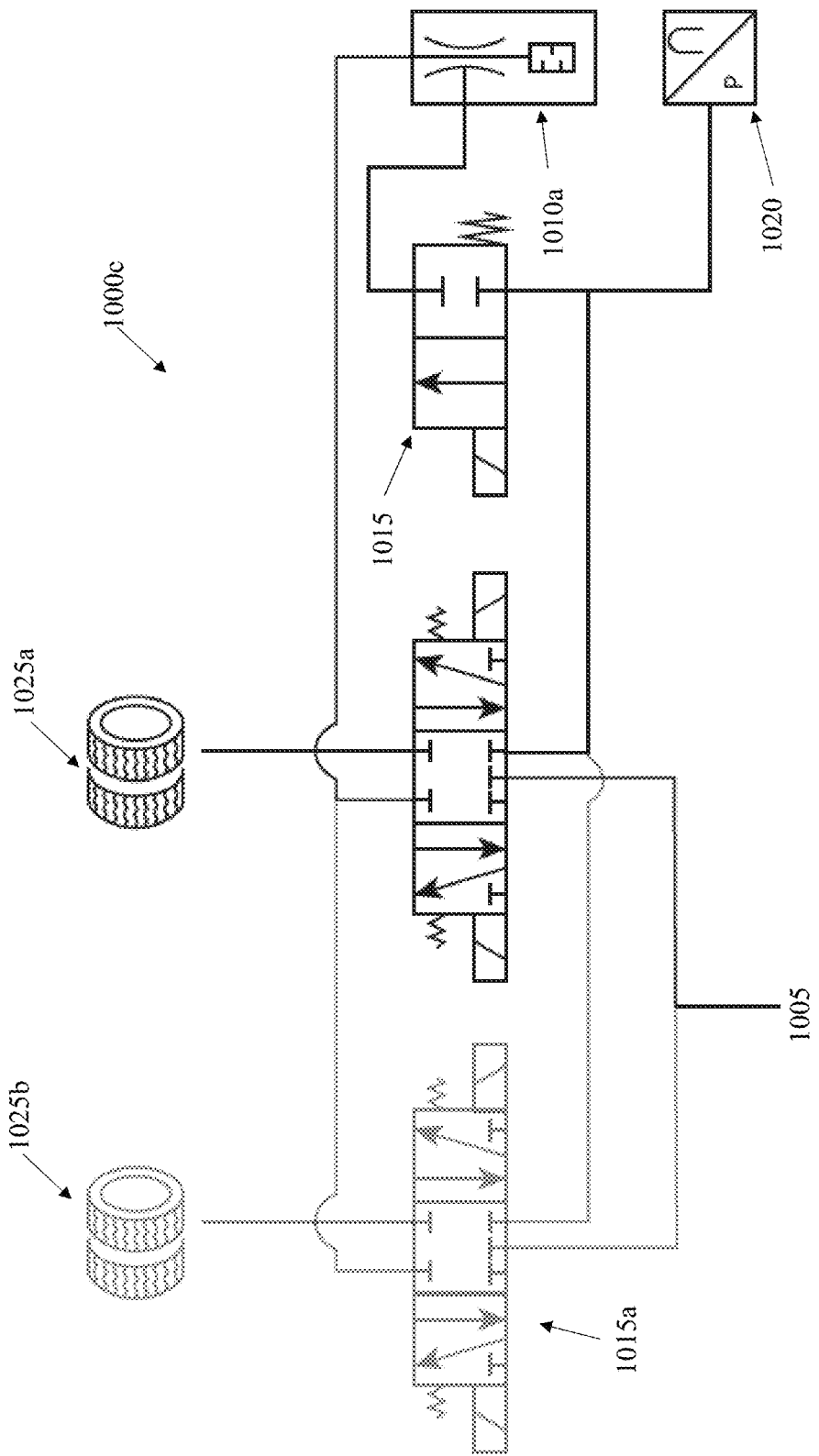
FIG. 10c illustrates an exemplary schematic of a pneumatic portion of a system for automatically inflating and deflating tires of a vehicle, according to an embodiment of the present invention.

FIG. 10c illustrates an exemplary schematic of a pneumatic portion of a system 1000c for automatically inflating and deflating tires of a vehicle, according to an embodiment of the present invention.

The system 1000c is similar to the system 1000b, but using five way three position solenoids 1015a to connect the tire groups 1025a, 1025b to the pressure transducer 1020, input 1005, or exhaust 1010a.

Figure 10D:
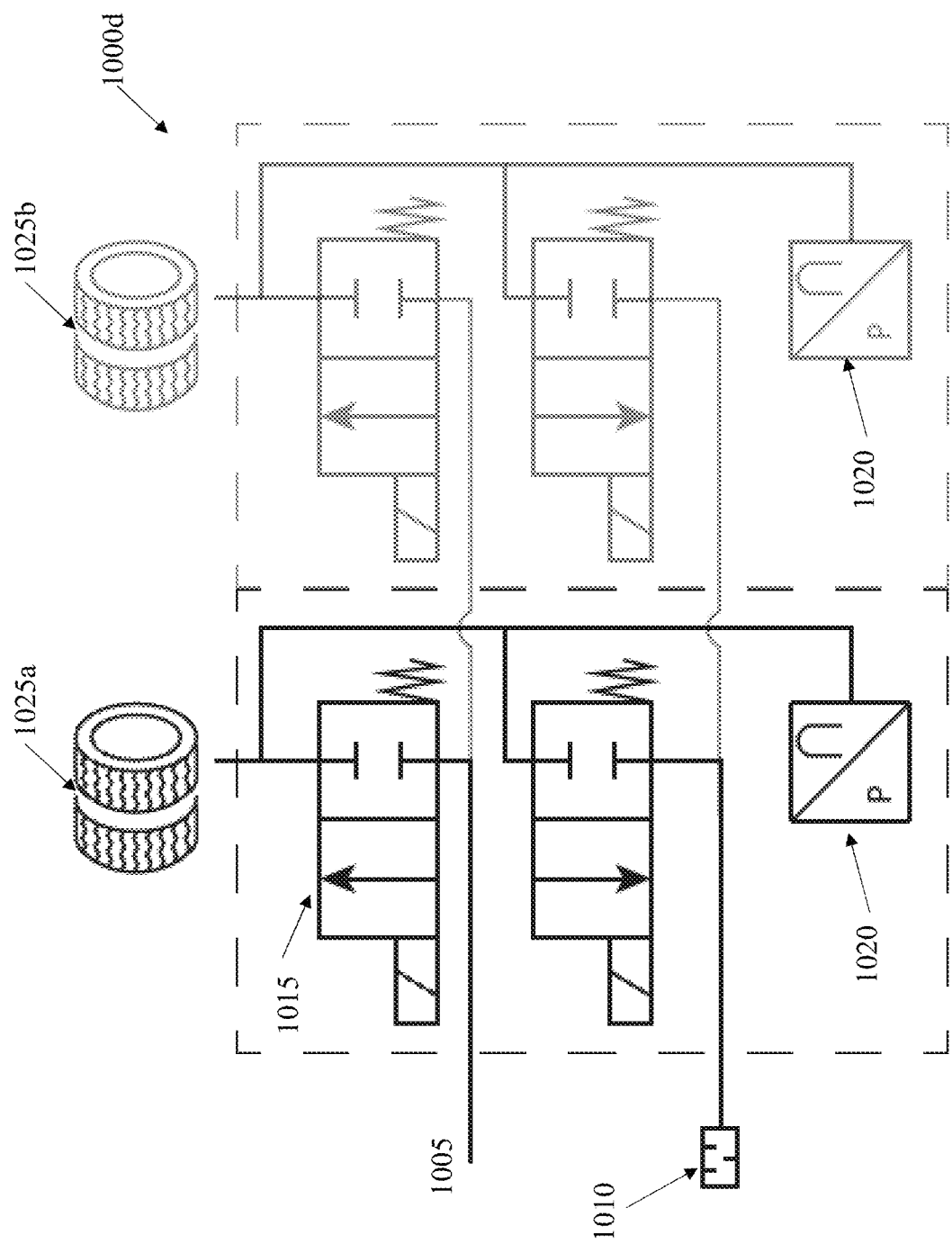
FIG. 10d illustrates an exemplary schematic of a pneumatic portion of a system for automatically inflating and deflating tires of a vehicle, according to an embodiment of the present invention.

FIG. 10d illustrates an exemplary schematic of a pneumatic portion of a system 1000d for automatically inflating and deflating tires of a vehicle, according to an embodiment of the present invention.

The system 1000d is similar to the system 1000a, but including identical modules for each tire group 1025a, 1025b, each comprising a pressure transducer 1020 and associated solenoids 1015.

Figure 10E:
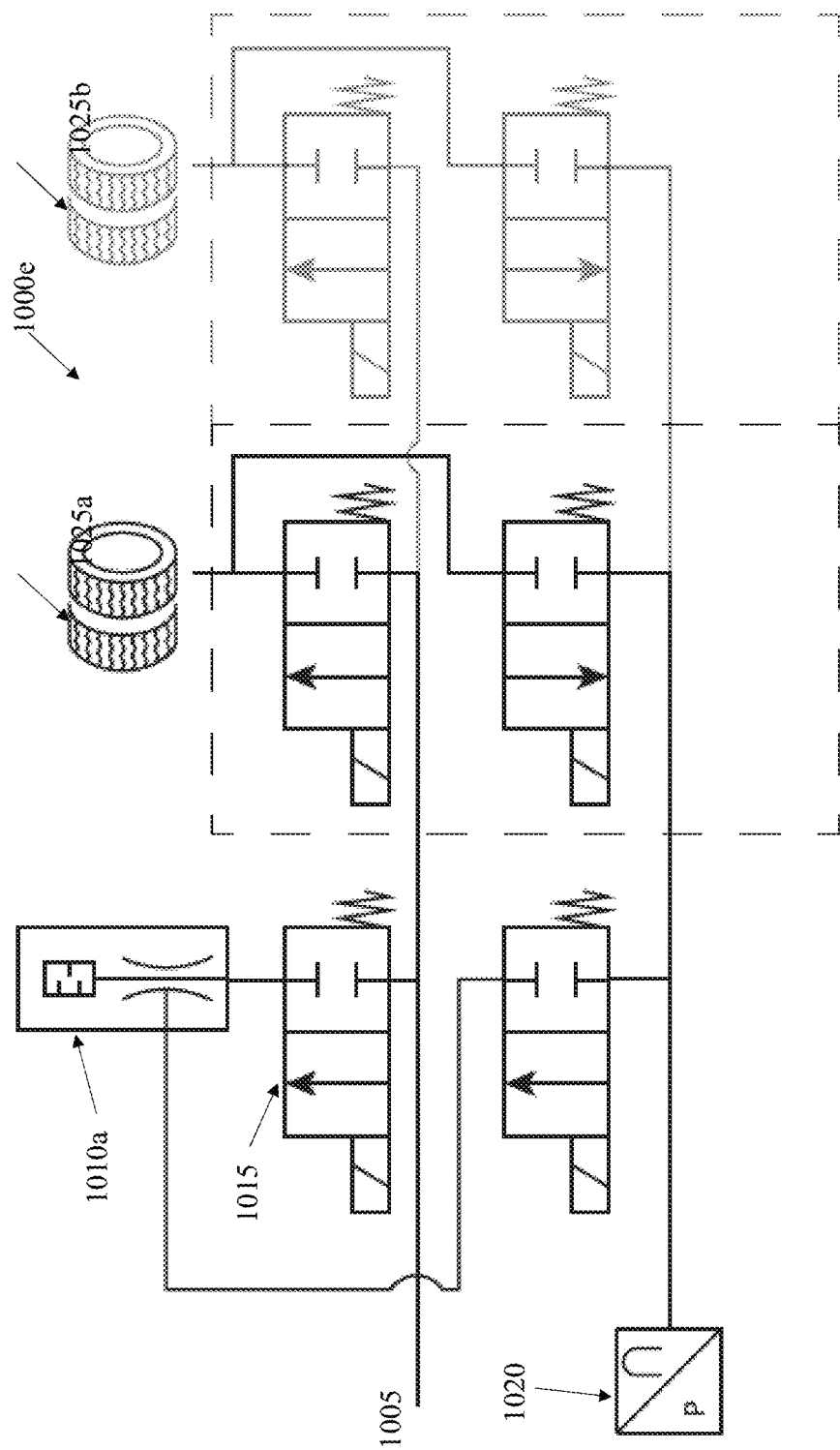
FIG. 10e illustrates an exemplary schematic of a pneumatic portion of a system for automatically inflating and deflating tires of a vehicle, according to embodiments of the present invention.

Finally, FIG. 10e illustrates an exemplary schematic of a pneumatic portion of a system 1000e for automatically inflating and deflating tires of a vehicle, according to embodiments of the present invention.

The system 1000e is similar to the system 1000b, but including identical modules for each tire group, each including solenoids 1015 for coupling to the tire group to the input 1005 or the pressure transducer 1020. Furthermore, the venturi exhaust 1010a is coupled to the air line of the pressure transducer by a solenoid 1015.

Aspects of the systems 1000a-1000e may be combined in any way.

In some embodiments, the system may include safety related features, such as puncture and leak detection. In such case, the system may detect drops in pressure in one or more of the tires, and alert a user. Furthermore, in case inflation times deviate from previously established inflation times, an alert or warning may issue to the user, prompting the user to check for leaks in the tires, hoses or elsewhere.

In some embodiments, the system includes automatic environmental calibration features, including automatic temperature and atmospheric pressure calibration. As an illustrative example, tire pressure may change by 1 to 2 psi when temperature changes by 20° F. Similarly, pressure in a vessel is generally measured with reference to atmospheric pressure, which can be affected by altitude.

While the above systems are primarily illustrated as being mounted in a vehicle, the skilled addressee will readily appreciate that the systems may be mounted in garages, workshops and the like. In such case, the system may include a wall-mount housing, longer hoses and hooks for hanging the hoses. Furthermore, such system would typically be mains powered and may be coupled to an existing workshop compressor.

Finally, while the above system has been illustrated with reference to a single vehicle, the skilled addressee will readily appreciate that the system may be used for a fleet of vehicles. In such case, configurations for each of a fleet of vehicles may be remotely configured using a central server. In such case, the configurations may include configuring pre-set pressure configurations for the fleet of vehicles, or any other configuration (including alert configurations).

Advantageously, the systems describe above provide a simple and accurate method of changing the pressure of tires (and other aspects) of a vehicle and trailer, according to changing needs of the vehicle 105. This is particularly beneficial when the vehicle 105 is transitioning between different surfaces, e.g. from asphalt to sand or vice versa, and in different driving conditions (e.g. towing or not, or loaded or not). Furthermore, the chucks described above provide a high-flow closed-type valve.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A tire management system, for automatically inflating and deflating tires of a vehicle, the system comprising:

flexible hoses including chucks, for releasably coupling to each of the tires of the vehicle, the chucks each associated with a valve that is opened when the chuck is connected to the tire and closed when the chuck is not connected to the tire;

an inlet, for receiving compressed gas, the inlet selectively couplable to the flexible hoses for inflating the tires of the vehicle;

an outlet, selectively couplable to the flexible hoses for deflating the tires of the vehicle; and a controller, configured to receive a desired target pressure for one or more of the tires and automatically couple the inlet or outlet to the flexible hoses and thereby to the one or more tires to achieve the target pressure, wherein the tires are grouped into two or more groups of tires, wherein the flexible hoses associated with each group of tires are fluidly connected, and wherein the controller is configurable to selectively couple the inlet or outlet to the flexible hoses associated with each group of tires to inflate and/or deflate the tires according to the groups of tires.

2. The tire management system of claim 1, wherein the two or more groups of tires include a group comprising front tires of the vehicle and a group comprising rear tires of the vehicle.

3. The tire management system of claim 1, further comprising a pressure transducer, coupled to the controller, wherein the controller is configured to automatically couple the inlet or outlet at least in part according to a pressure from the pressure transducer.

4. The tire management system of claim 1, wherein the groups of tires are selectively couplable to the pressure transducer, to enable measurement of each of the groups of tires individually.

5. The tire management system of claim 1, wherein the controller includes a memory, including a plurality of pre-set tire pressure settings, wherein the controller receives a desired target pressure by receiving a pre-set tire pressure setting.

6. The tire management system of claim 1, wherein at least part of the system is permanently mounted to the vehicle.

7. The tire management system of claim 6, further including one or more vehicle mounting panels, to which the flexible hoses may be releasably attached.

8. The tire management system of claim 7, wherein the vehicle mounting panels include a Schrader valve for each tire.

9. The tire management system of claim 1, wherein the chucks comprise flexible hoses including quick connect air chucks on ends thereof.

10. The tire management system of claim 1, further including a user interface, for enabling a user to select a desired target pressure.

11. The tire management system of claim 10, wherein the user interface enables indirect selection of the desired target pressure by selection of a pre-set tire pressure setting of a plurality of pre-set tire pressure settings.

12. The tire management system of claim 10, wherein the user interface includes a dial, for selecting a desired target pressure.

13. The tire management system of claim 1, further including a display, for displaying information to the user, the display configured to display selected pressure settings.

14. The tire management system of claim 1, further including a plurality of solenoids, configurable to selectively couple each group of tires to the inlet or outlet.

15. The tire management system of claim 1, further including a manifold, including a pressure transducer, wherein the system includes solenoids for selectively coupling each of the tire groups, the inlet, and the outlet to the manifold.

16. The tire management system of claim 1, wherein the gas comprises air.

17. The tire management system of claim 1, further comprising a high-pressure compressed air source coupled to the inlet, the high-pressure compressed air source including a compressed air reservoir and an air compressor.

18. The tire management system of claim 1, wherein the outlet includes a venturi exhaust.

19. The tire management system of claim 18, wherein the venturi exhaust is coupled to a high-pressure compressed air source such that flow of air from the high-pressure air source creates suction to assist in deflating the one or more tires.

* * * * *